United States Patent [19]

Chitayat

[11] Patent Number: 4,625,132

[45] Date of Patent: Nov. 25, 1986

[54] LINEAR MOTOR WITH SEAL

[75] Inventor: Anwar Chitayat, Northport, N.Y.

[73] Assignee: Anorad, Hauppauge, N.Y.

[21] Appl. No.: 638,488

[22] Filed: Aug. 7, 1984

[51] Int. Cl.$^4$ .............................................. H02K 41/02
[52] U.S. Cl. ........................................ 310/13; 310/27
[58] Field of Search .................................. 310/12–14, 310/27

[56] References Cited

U.S. PATENT DOCUMENTS

| | | | |
|---|---|---|---|
| 3,681,630 | 8/1972 | Sutton | 310/13 X |
| 4,016,441 | 4/1977 | Herr et al. | 310/13 |
| 4,115,712 | 9/1978 | Guimbal | 310/13 X |
| 4,151,447 | 4/1979 | Von der Heide | 310/12 X |
| 4,166,284 | 8/1979 | Daniels | 310/13 X |
| 4,172,229 | 10/1979 | Guimbal | 310/13 |
| 4,227,100 | 10/1980 | Ezebiel et al. | 310/13 |

Primary Examiner—Donovan F. Duggan
Attorney, Agent, or Firm—Thomas R. Morrison

[57] ABSTRACT

A linear motor of the type having an elongated stator contained in a U-shaped channel includes a linearly moving element connected to its load by a connecting beam which passes out of the U-shaped channel. A flexible seal on each arm of the U-shaped channel seals against the sides of the beam where it passes out of the U-shaped channel and opposed elements of the seal abut each other to provide a barrier in other areas. In one embodiment of the invention, a positive pressure of a clean gas is maintained within the sealed U-shaped channel to prevent entry of atmospheric contaminants. In another embodiment of the invention, the seal in the vicinity of the beam is purposely made less than perfect so that the cooling gas is encouraged to flow toward, and exit in the vicinity of, the region where maximum cooling is required. In a further embodiment of the invention, channels in the beam and the moving element direct a controlled flow of cooling gas between the stator and the moving element to concentrate the cooling gas in that location.

14 Claims, 6 Drawing Figures

LINEAR MOTOR WITH SEAL

BACKGROUND OF THE INVENTION

The present invention relates to electric motors and, more particularly, to linear electric motors.

Electric motors conventionally include a stationary portion, or stator, and a movable portion, or rotor. In electric motors adapted for turning an output shaft, the rotor is concentrically arranged with the stator. Although thee most common rotary motor employs a cylindrical rotor rotating within an annular stator, the reverse arrangement is not unknown.

An electric motor of the linear type has more recently found use in certain applications. A linear motor employs a stator which can be thought of as being similar to the stator of a rotary motor which has been developed, or opened out, into a flattened assembly. Similarly, the rotor of the rotary motor is replaced by a linear counterpart which moves in a line with respect to the stator.

Alternating current versions of linear motors of the synchronous type are disclosed in U.S. Pat. Nos. 3,594,622; 3,699,365 and 3,706,922, among many others. Linear motors of the induction type are disclosed in U.S. Pat. Nos. 3,770,995; 3,824,414 and 3,884,154, among many others.

An even more recent type of linear motor employs direct current using either wound field-generating coils on both the moving and stationary elements or using one wound element and one element which employs one or more permanent magnets. Such a linear motor is disclosed in U.S. patent application Ser. No. 383,351, invented by the present applicant. In the referenced patent application, a stator employs a U-shaped channel to contain the stator field-generating elements. A movable element is guided to move along the axis of the U-shaped channel. An apparatus to be linearly displaced is connected to the moving element.

Linear motors of both the AC and DC types frequently operate in a factor, or other applications, where the environment is far from clean. Dust, dirt and corrosive gases may be present in such applications. Such contaminants, if permitted access to the interior of a linear motor can, at the least, cause a cleaning problem and, in more severe situations, can cause shorting, breakdown or failure of commutation. One solution has been the employment of accordion-pleated flexible jackets sealed about the linear motor to exclude environmental contaminants. Such jackets are typically expensive and their bulk interferes with ready access to the linear motor.

A further problem which must be addressed with al electric motors, and particularly those in which a substantial amount of power must be dissipated, is the maintenance of a reasonable temperature in the elements of the linear motor. In the referenced patent application, the amount of heat generated by the wound stator is reduced by a commutation technique wherein only those coils within the influence of the magnitic field of the moving element are energized at an time. Thus, a region of the stator in which heat may be generated moves along the stator with the moving element. In motors of relatively low power dissipation, convection cooling can be relied on to avoid overheating. At higher power dissipations, some type of forced cooling is required.

OBJECTS AND SUMMARY OF THE INVENTION

It is an object of the invention to provide apparatus for improving the local environment to which a linear motor is exposed.

It is a further object of the invention to provide a seal for an opening of a U-shaped channel of a linear motor effective for excluding at least a substantial part of atmospheric pollutants from the interior of the linear motor.

It is a still further object of the invention to provide a seal for an opening of a U-shaped channel of a linear motor and means for maintaining a positive gas pressure within the U-shaped channel. The positive gas pressure is effective to exclude contaminants from the interior of the linear motor.

It is a still further object of the invention to provide a seal for a linear motor effective for directing a flow of cooling gas to an active region of a wound field-generating element of the linear motor.

Briefly stated, the present invention provides a linear motor of the type having an elongated stator contained in a U-shaped channel. A linearly moving element is connected to its load by a connecting beam which passes out of the U-shaped channel. A flexible seal on each arm of the U-shaped channel seals against the sides of the beam where it passes out of the U-shaped channel and opposed elements of the seal abut each other to provide a barrier in other areas. In one embodiment of the invention, a positive pressure of a clean gas is maintained within the sealed U-shaped channel to prevent entry of atmospheric contaminants. In another embodiment of the invention, the seal in the vicinity of the beam is purposely made less than perfect so that the cooling gas is encouraged to flow toward, and exit in the vicinity of, the region where maximum cooling is required. In a further embodiment of the invention, channels in the beam and the moving element direct a controlled flow of cooling gas between the stator and the moving element to concentrate the cooling gas in that location.

According to an embodiment of the invention, there is provided a linear motor comprising a linear stator, a U-shaped channel containing the linear stator, a movable element linearly movable within the channel substantially parallel to the linear stator, connecting means for connecting the movable element to a load external to the U-shaped channel, sealing means for sealing an opening in the U-shaped channel and the sealing means including means for substantially sealing the connecting means where it leaves the U-shaped channel whereby environmental contaminants are substantially excluded from an interior of the U-shaped channel.

According to a feature of the invention, there is provided a linear motor comprising a linear stator, a U-shaped member enclosing the linear stator, a movable element movable in the U-shaped member substantially parallel to the linear stator, connecting means for connecting the movable element to an external element external to the U-shaped member, means for sealing an opening in the U-shaped member and means for applying a clean gas to an interior of the U-shaped member whereby a positive pressure of the clean gas is maintained in the U-shaped member and atmospheric contaminants are excluded from the interior of the U-shaped member.

DETAILED DESCRIPTION OF THE PREFERRED EMBODIMENT

Figure 1:
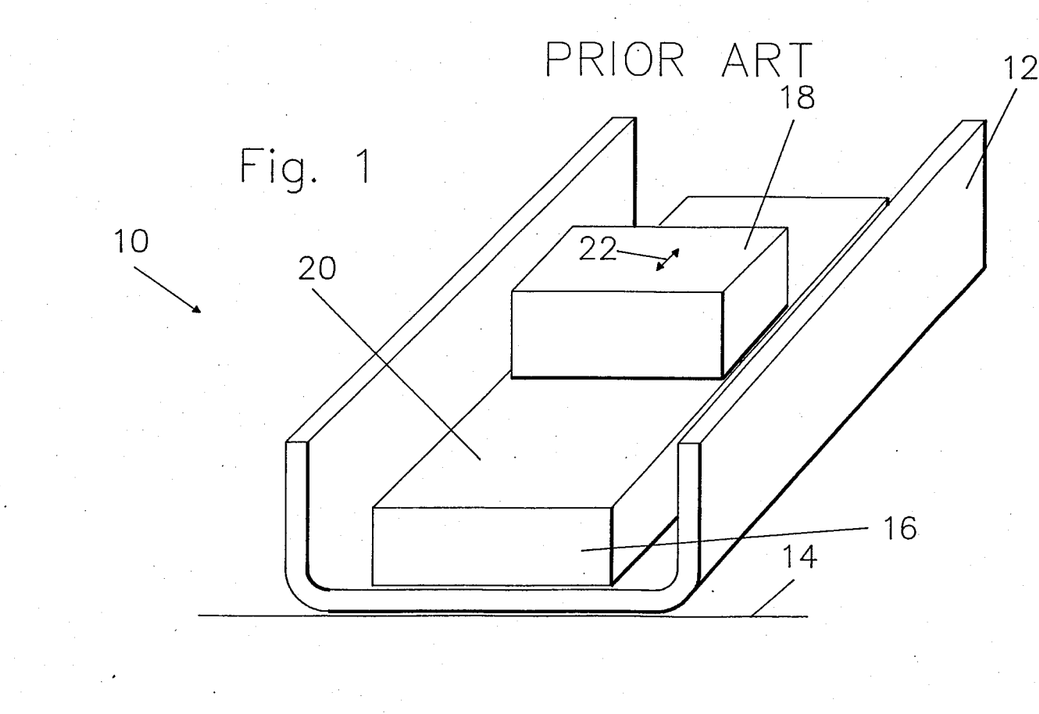
FIG. 1 is a perspective view of a linear motor according to the prior art.

Referring now to FIG. 1, there is shown, generally at 10, a linear motor according to the prior art. A U-shaped channel 12, which is mountable on a convenient mounting surface 14, encloses a wound stator 16. A movable element 18 is supported by any convenient means for movement parallel to an upper surface 20 of wound stator 16 along an axis indicated by a double-headed arrow 22. The support for movable element 18 may be, for example, a positioning table to which it is affixed as shown, for example, in the referenced patent application. Upper surface 20 includes windings (not shown) in slots thereof which receive power from a power source or control system (not shown) for producing a magnetic field to which movable element 18 is exposed. Movable element 18 also includes means for producing a magnetic field for interaction with the magnetic field produced by movable element 18 whereby movable element 18 is urged to move along the axis indicated by double-headed arrow 22.

In the particular embodiment of the reference, movable element 18 includes a plurality of permanent magnets on its surface facing upper surface 20. In addition, the referenced embodiment employs a DC power source suitably controlled and commutated by stationary linear slip rings and a commutator which are contacted by brushes affixed to move with movable element 18. In this way, only the coils in wound stator 16 which are within the magnetic influence of movable element 18 are energized. The open design of linear motor 10 permits access of environmental contaminants to the interior of linear motor 10. As previously noted, this may be undesirable. In addition, the linear motor of FIG. 1 does not contain any inherent adaptation for forced cooling. The maximum power dissipation which linear motor 10 is capable of withstanding without an unacceptable temperature rise is therefore limited by the amount of heat which can be dissipated with normal convection cooling.

Figure 2:
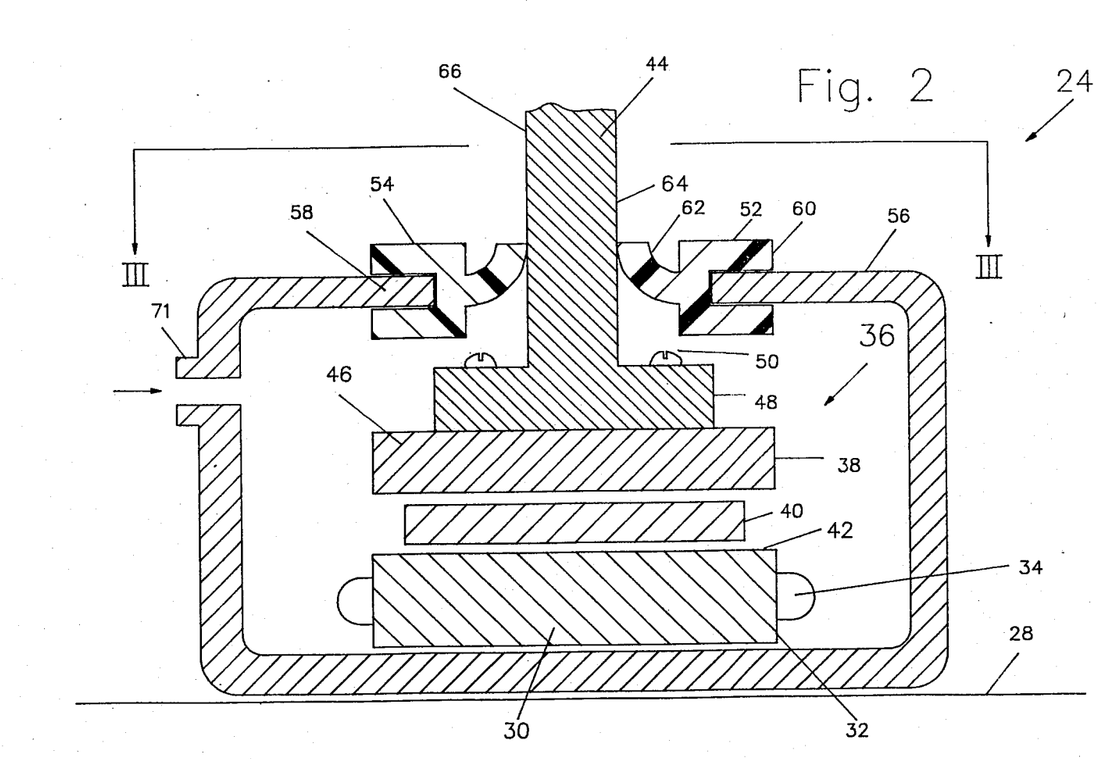
FIG. 2 is a transverse cross section of a linear motor according to an embodiment of the invention.

Referring now to FIG. 2, there is shown a linear motor 24 according to an embodiment of the invention. A U-shaped channel 26, suitable for mounting on a mounting surface 28 contains a wound stator 30 therein including a laminated body of magnetic material 32 having a plurality of slots (not shown) in which a plurality of windings 34 are laid. A movable element, shown generally at 36, includes a carrier plate 38 having a plurality of permanent magnets 40 affixed to its underside facing a planar upper surface 42 of wound stator 30.

It would be recognized that suitable means must be provided to feed power to windings 34. However, since such means for feeding power is conventional, and may take many alternate forms not of interest here, a further detailed description thereof is omitted from the present disclosure. In addition, it would be recognized that the relative locations of wound stator 30 and permanent magnet 40 could be interchanged without departing from the scope of the invention. In addition, permanent magnets 40 may suitably be replaced by a slotted mass of magnetic material, in which current-carrying windings (not shown) may be disposed, without departing from the scope of the invention.

A connecting beam 44 is affixed to an upper surface 46 of carrier plate 38 using a flange 48 at a lower end of connecting beam 44 and a plurality of bolts 50. Connecting beam 44 passes upward to a support device (not shown) such as, for example, a guided positioning table, for constraining a spacing between permanent magnet 40 and planar upper surface 42 and for guiding movable element 36 along a linear axis which, in FIG. 2, is disposed perpendicular to the page. First and second flexible seals 52 and 54 are sealingly installed on inward-directed flanges 56 and 58 at the mouth of U-shaped channel 26. Inward-directed flanges 56 and 58 each include a cuff portion 60 embracing its respective inward-directed flange 56 or inward-directed flange 58 and a flexible sealing torque 62 which is capable of sealingly bearing against a respective side surface 64 or side surface 66 of connecting beam 44. As shown in FIG. 2, flexible sealing tongues 62 may be deflected upward to provide a substantially gas-tight seal. Other sealing concepts may be used without departing from the spirit and scope of the invention. For example, instead of using deflection of flexible sealing tongues 62, a corresponding seal may be produced using a compressible material in a seal whereby the portion of the seal contacting connecting beam 44 is compressed rather than deflected. In addition, instead of using a thick tip on flexible sealing tongue 62 as shown, a pointed tip or one having any other convenient cross-sectional shape may be employed.

Figure 3:
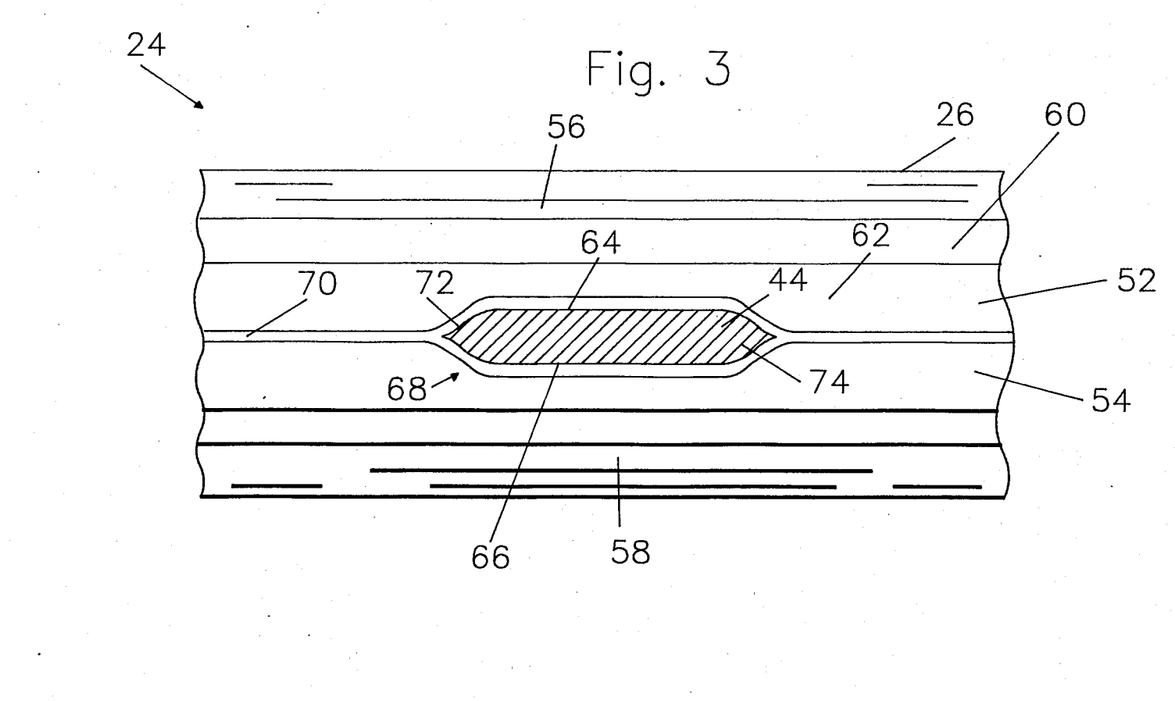
FIG. 3 is a cross section taken along III—III of FIG. 2.

Referring now to FIG. 3, a top view of linear motor 24 is shown. A longitudinal dimension of connecting beam 44 is assumed to be substantially smaller than a longitudinal dimension of U-shaped channel 26. Thus, a seal region 68 is defined by the region of contact between side surfaces 64 and 66 of connecting beam 44 with flexible sealing tongues 62 of flexible seals 52 and 54. Beyond the ends of seal region 68, the undeflected (or uncompressed) edges of flexible sealing tongues 62 are disposed either in close proximity to each other, sealingly abut each other in an abutment region 70 or overlap each other. Longitudinal extremities 72 and 74 are preferably tapered to enable flexible sealing tongues 62 to more smoothly perform the transition between seal region 68 and abutment region 70 and to thereby improve the overall sealing performance of the invention.

The embodiment of the invention disclosed in FIGS. 2 and 3, without more, improves the ability of linear motor 24 to exclude dust, dirt and atmospheric contaminants from its interior. Further improvement in excluding contaminants may be achieved by employing the sealed U-shaped channel 26 as a conduit in which a positive pressure of a clean gas is maintained. In this manner, any leaks in the seal provided by the apparatus of the invention produce a gas outflow which prevents the entry of environmental air and thus prevents the entry of contaminants. The clean gas may be introduced at one end of U-shaped channel 26 and the other end may be sealed, may be introduced at both ends of U-shaped channel 26, or may be introduced at appropriate intermediate locations such as, for example, at a port 71 along U-shaped channel 26.

It should now be recalled that, in the referenced patent application, a commutating system localizes the energized coils and the consequent heating to those coils in the vicinity of movable element 36 (FIG. 2). In a further embodiment of the invention, the seal provided at abutment region 70 may preferably be substantially complete and the seal provided in seal region 68 may be less than complete. Thus, a controlled loss of gas is set up in the vicinity of connecting beam 44 which produces a flow of the gas through U-shaped channel 26 as a coolant to the vicinity of movable element 36 regardless of where along U-shaped channel 26 movable element 36 happens to be located. In this manner, the present invention is effective not only as a means for maintaining the interior of linear motor 24 in a clean condition, but also as a means for delivering cooling gas preferentially to the vicinity where heat is generated and thus must be dissipated.

Figure 4:
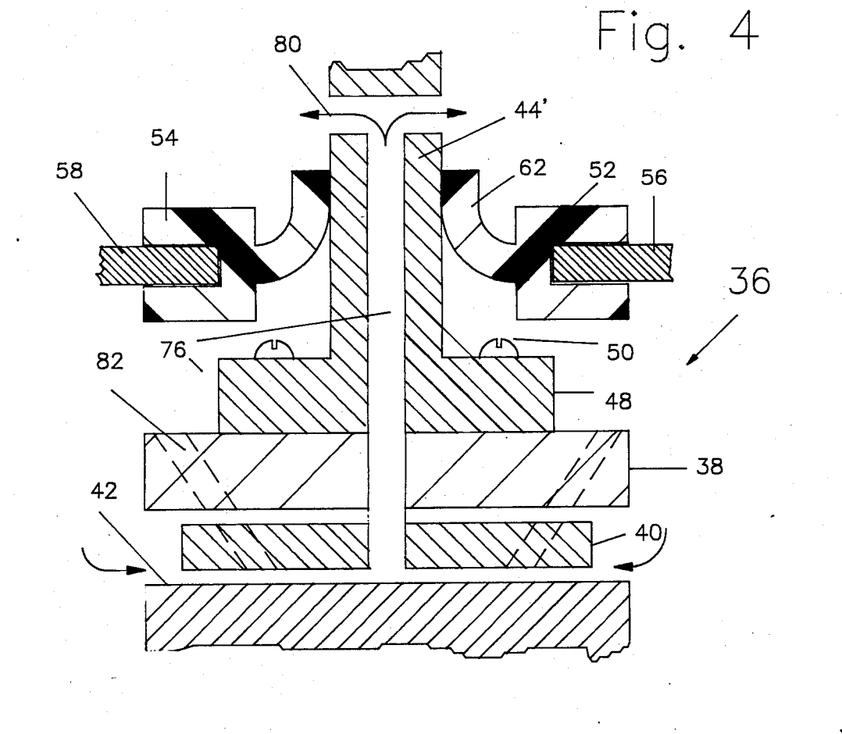
FIG. 4 is a close-up view similar to FIG. 3 showing an additional cooling channel for directing cooling gas between the stationary and movable portions.

Referring now to FIG. 4, a further embodiment of the invention is shown in which a connecting beam 44' includes an air source 76 which continues through flange 48, carrier plate 38 and through, or between, permanent magnet 40 to open into an air space 78 between permanent magnet 40 and planar upper surface 42. An exit port 80 is provided in connecting beam 44' above the point of sealing contact with flexible sealing tongues 62. A controlled flow of cooling gas is forced into air space 78 and through air source 76 to exit to the atmosphere through exit port 80. This controlled flow of cooling gas may supplement, or replace, the gas flow which is urged toward movable element 36 by leakage. The embodiment of FIG. 4 has the additional advantage of directing coolant gas flow into air space 78 where heating is most likely to be severe and which may be poorly served with cooling gas in the prior embodiment, particularly when movable element 36 remains stationary for an extended period.

It is also within the contemplation of the present invention to provide other channels for the passage of cooling gas into air space 78. For example, one or more diagonal channels 82, shown in dashed line in FIG. 4, may pass diagonally through carrier plate 38 to direct a flow of cooling gas into air space 78 in any desired pattern to achieve satisfactory cooling of wound stator 30.

Figure 5:
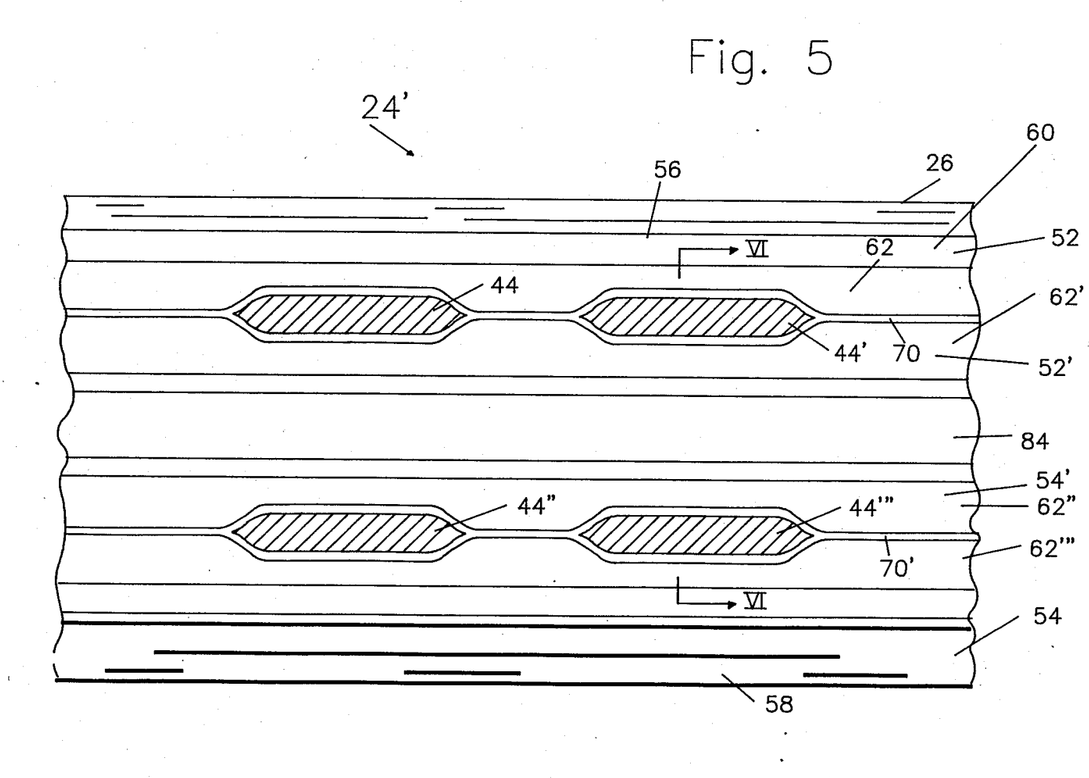
FIG. 5 is a view corresponding to the view in FIG. 3 except with four connecting beams connecting a movable element to a support structure.

Referring now to FIG. 5, a linear motor 24' is shown which may be employed to provide more rigid attachment of a movable element 36 than is possible with the embodiments of the invention previously shown and described. Instead of a single connecting beam 44, shown in the preceding embodiments, the embodiment of FIG. 5 employs four connecting beams 44, 44', 44" and 44'" disposed in a rectangular pattern for connecting a movable element 36 (not shown) to a supporting element such as, for example a positioning table (not shown) with greater rigidity than is possible using only a single connecting beam 44 of the preceding embodiment. Connecting beams 44 and 44' are aligned in the longitudinal direction for sealable motion along an abutment region 70. Similarly, connecting beams 44" and 44'" are longitudinally aligned for sealable motion along a second abutment region 70'. The method for obtaining a seal and the quality of the seal obtained are the same as previously described.

Figure 6:
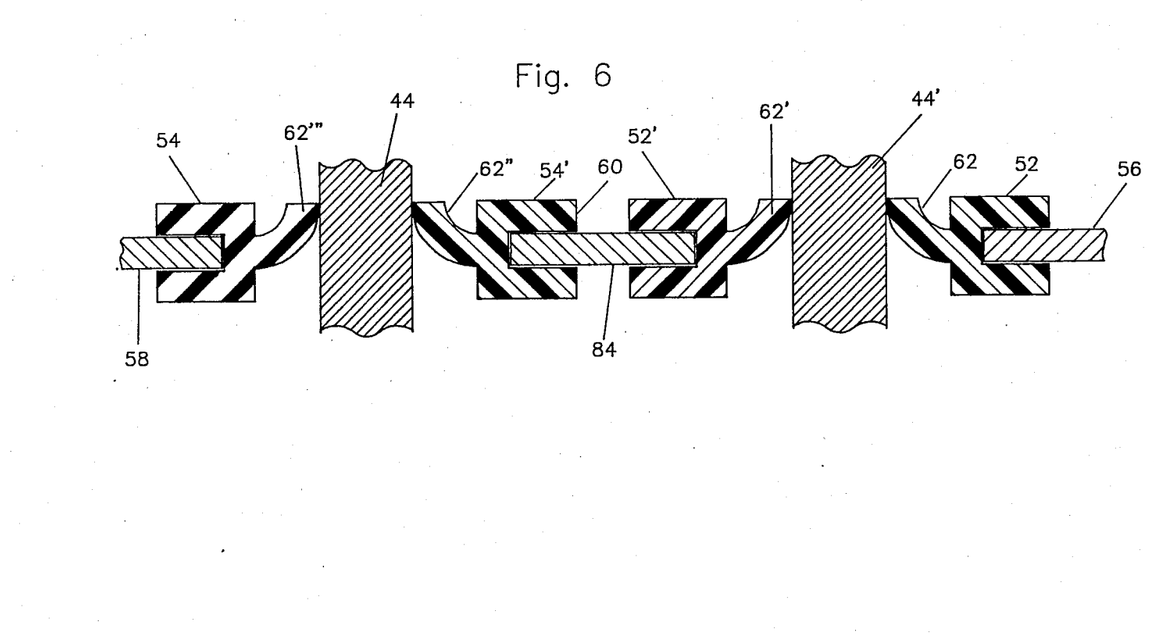
FIG. 6 is a cross section taken along VI—VI of FIG. 5.

Referring now also to FIG. 6, it will be noted that, in order to create an additional abutment region 70', an additional flexible seal 52' is required to seal an inboard side of connecting beams 44 and 44' and a further additional flexible seal 54' is required to seal an inboard side of connecting beams 44" and 44'". Flexible seals 52' and 54' may be merely opposed ends of a resilient element inserted between the two pairs of connecting beams: however, in the preferred embodiment, a suitable stiffening member 84 may be inserted between flexible seals 52' and 54'. Stiffening member 84 may be of any suitable material such as, for example of metal as shown or of a plastic or composite material. If a substantial pressure is permitted to develop within linear motor 24', stiffening member 84 may be given suitable bosses or webs (not shown) to resist forces upon it developed by such pressure. Stiffening member 84 is preferably connected at its ends to U-shaped channel 26 by conventional means (not shown).

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A linear motor comprising:
   a linear stator;
   a U-shaped channel contained in said linear stator;
   a movable element linearly movable within said channel substantially parallel to said linear stator;
   connecting means for connecting said movable element to a load external to said U-shaped channel;
   sealing means for sealing an opening between first and second arms of said U-shaped channel;
   said sealing means including a first seal affixed to said first arm and a second seal affixed to said second arm;
   said first and second seals including first and second flexible sealing portions respectively;
   said first and second flexible sealing portions including substantially abutting portions effective for forming a seal therebetween; and
   said sealing means including means for permitting said connecting means to pass between said first and second flexible sealing portions whereby environmental contaminants are substantially excluded from an interior of said U-shaped channel.

2. A linear motor according to claim 1 wherein said means for sealing includes at least tapered ends on said connecting means whereby a transition of said sealing means to said connecting means is enabled.

3. A linear motor according to claim 1 wherein said flexible sealing portions further include means for permitting at least one of a deflection and a compression thereof about said connecting means whereby a substantial seal is maintained about said connecting portion.

4. A linear motor according to claim 1, further comprising means for maintaining a positive pressure of a clean gas in said U-shaped channel whereby environmental contaminants are positively excluded from an interior of said linear motor.

5. A linear motor according to claim 4 whereby said sealing means includes a portion having less than a perfect seal.

6. A linear motor according to claim 5 wherein said portion having less than a perfect seal is disposed in a vicinity of said movable element whereby said clean gas is enabled to preferentially escape in the vicinity of said movable element and is effective to act as a coolant gas.

7. A linear motor according to claim 1 further comprising;
means for maintaining a positive pressure of a clean gas within said U-shaped channel;
at least one channel for the passage of said clean gas through said connecting means from inside said sealing means to outside said sealing means;
said at least one channel being effective for passing said clean gas as a coolant gas in a flow at least in a vicinity of a facing part of at least said linear stator and said movable element.

8. A linear motor according to claim 1 wherein said connecting means includes at least first and second connecting means passing through said opening.

9. A linear motor according to claim 8 wherein said first and connecting means are aligned in a direction of linear motion of said movable element.

10. A linear motor according to claim 8 wherein said at least first and second connecting means are displaced transversely to a direction of linear motion of said movable element and said sealing means further includes first sealing means for sealing a first opening aligned with said first connecting means and a second sealing means for sealing a second opening aligned with said second connecting means.

11. A linear motor according to claim 8 wherein said first and second connecting means are displaced transversely to a direction of linear motion of said movable element, said sealing means includes first and second flexible seals respectively disposed on first and second arms of said U-shaped channel, said first and second flexible seals including first and second flexible sealing portions respectively, said first and second flexible sealing portions sealingly abutting transversely outside portions of said first and second connecting means, said sealing means further including third and fourth flexible seals sealingly abutting inside portions of said first and second connecting means, said first and third flexible sealing means including means for forming a mutual seal therebetween and said second and fourth flexible sealing means including means for forming a mutual seal therebetween.

12. A linear motor according to claim 11 wherein said sealing means further includes a stiffening member between said third and fourth flexible sealing means.

13. A linear motor comprising:
a linear stator;
a U-shaped member enclosing said linear stator;
a movable element movable in said U-shaped member substantially parallel to said linear stator;
connecting means for connecting said movable element to an external element external to said U-shaped member;
sealing means for sealing an opening between first and second arms of said U-shaped member;
said sealing means including a first seal affixed to said first arm and a second seal affixed to said second arm;
said first and second seals including first and second flexible sealing portions, respectively;
said first and second flexible sealing portions including means for forming a mutual seal therebetween;
said first and second flexible sealing portions including means for permitting said connecting portion to pass therebetween; and
means for applying a clean gas to an interior of said U-shaped member whereby a positive pressure of said clean gas is maintained in said U-shaped member and atmospheric comtaminants are excluded from said interior to said U-shaped member.

14. A linear motor according to claim 13 further comprising:
at least one channel in said connecting member between an interior of said U-shaped member and an exterior of said U-shaped member;
said at least one channel being effective for permitting a controlled flow of said clean gas therethrough; and
said at least one channel being positioned to direct said controlled flow in a region of at least one of said linear stator and said movable element for the removal of heat therefrom.

* * * * *